United States Patent
Vihar et al.

(10) Patent No.: US 11,397,569 B2
(45) Date of Patent: Jul. 26, 2022

(54) DEPLOYING MICRO FRONTENDS TO DIFFERENT CLUSTERS FROM A SINGLE REPOSITORY

(71) Applicant: SAP SE, Walldorf (DE)

(72) Inventors: Sathish Babu Krishna Vihar, Cupertino, CA (US); Arun Kumar Reddy Janga, Santa Clara, CA (US); Anantharaman Kalyanakrishnan, Union City, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/128,957

(22) Filed: Dec. 21, 2020

(65) Prior Publication Data
US 2022/0197620 A1     Jun. 23, 2022

(51) Int. Cl.
*G06F 8/60*     (2018.01)
*G06F 8/10*     (2018.01)
*G06F 8/36*     (2018.01)

(52) U.S. Cl.
CPC .................. *G06F 8/60* (2013.01); *G06F 8/10* (2013.01); *G06F 8/36* (2013.01)

(58) Field of Classification Search
CPC ....................................... G06F 8/60; G06F 8/10
USPC ................... 717/168–174; 709/203
See application file for complete search history.

(56) References Cited

U.S. PATENT DOCUMENTS

| | | | | |
|---|---|---|---|---|
| 6,389,589 B1* | 5/2002 | Mishra | ...................... | G06F 8/61 709/219 |
| 6,393,485 B1* | 5/2002 | Chao | ................... | G06F 11/1425 709/231 |
| 6,523,027 B1* | 2/2003 | Underwood | ............ | G06F 9/465 |
| 7,263,686 B2* | 8/2007 | Sadiq | .................. | G06F 9/44505 717/110 |
| 7,614,052 B2* | 11/2009 | Wei | .......................... | G06F 8/44 717/176 |
| 7,941,521 B1* | 5/2011 | Petrov | ..................... | H04L 43/08 709/224 |
| 7,970,923 B2* | 6/2011 | Pedersen | ................. | H04L 67/06 709/231 |
| 8,074,217 B2* | 12/2011 | James | ...................... | G06F 8/60 717/169 |
| 8,661,406 B2* | 2/2014 | Shapiro | ..................... | G06F 8/61 717/172 |
| 8,769,522 B2* | 7/2014 | Venkatraman | ........ | H04L 63/104 717/173 |

(Continued)

OTHER PUBLICATIONS

Dominikus, "A Hardware Implementation of MD4-Family Hash Algorithms", IEEE, pp. 1143-1146 (Year: 2002).*

(Continued)

*Primary Examiner* — Anil Khatri
(74) *Attorney, Agent, or Firm* — Fish & Richardson P.C.

(57) ABSTRACT

The present disclosure involves systems, software, and computer implemented methods for deploying micro frontends to different clusters from a single repository. One example method includes receiving, by a user interface (UI) deployment service running in a runtime cluster, a name and hash of a UI module to deploy. The module name and hash are used to update a shell service database used by a shell service serving applications for the runtime cluster. A manifest is generated for the runtime cluster using the updated shell service database. The UI deployment service stores the manifest in a manifest repository in a cluster-specific folder. A manifest location value in the shell service database is updated to refer to the cluster-specific folder, to enable the shell service, in response to an application request to load the UI module, to access the manifest to determine a UI bundle file name for loading the UI module.

20 Claims, 5 Drawing Sheets

(56) References Cited

U.S. PATENT DOCUMENTS

| | | | | |
|---|---|---|---|---|
| 8,893,109 | B2* | 11/2014 | Birtwhistle | G06F 8/65 717/170 |
| 9,774,600 | B1* | 9/2017 | Streete | G06F 21/45 |
| 9,817,657 | B2* | 11/2017 | Hill | G06F 8/30 |
| 10,678,600 | B1* | 6/2020 | Darling | G06F 9/505 |
| 10,740,081 | B2* | 8/2020 | Newell | G06F 9/5088 |
| 10,922,284 | B1* | 2/2021 | Venkatasubramanian | H04L 67/02 |
| 11,018,899 | B1* | 5/2021 | Melkild | G06F 9/45558 |
| 11,194,566 | B1* | 12/2021 | Gabrielson | H04L 67/10 |

OTHER PUBLICATIONS

Filliatre et al, "Type-Safe Modular Hash-Consing", ACM, pp. 12-19 (Year: 2006).*

Hsu et al, "Designed a Hash Based Control Mechanism in vSwitch for Software-Defined Network Environment", IEEE, pp. 498-499 (Year: 2015).*

Jin et al, "Functionality-oriented Microservice Extraction Based on Execution Trace Clustering", IEEE, p. 211-218 (Year: 2018).*

Shahoud et al, "Facilitating and Managing Machine Learning and Data Analysis Tasks in Big Data Environments using Web and Microservice Technologies", CM, pp. 80-87 (Year: 2019).*

Klock et al, "Workload-based Clustering of Coherent Feature Sets in Microservice Architectures", IEEE, pp. 11-20 (Year: 2017).*

Me et al, "Optimizing a Parallel Runtime System for Multicore Clusters: A Case Study", ACM, pp. 1-10 (Year: 2010).*

Peng et al, "SilkRoad: A Multithreaded Runtime System with Software Distributed Shared Memory for SMP Clusters", IEEE, pp. 243-249 (Year: 2000).*

U.S. Appl. No. 17/104,598, filed Nov. 25, 2020, Vihar et al.

* cited by examiner

```
apiVersion: batch/v1
kind: Job  302
metadata:
  name: <module>-ui-deploy # INSERT YOUR MODULE NAME HERE
spec:
  backoffLimit: 4  304
  template:
    metadata:
      name: <module>-ui-deploy # INSERT YOUR MODULE NAME HERE
    spec:
      containers:
      - env:  308
        - name: MODULE_KEY
          value: {module_key} # replaced with module key in pipeline
        - name: MODULE_HASH  310
          value: {module_hash} # replaced with module hash in pipeline
        image: cxm-dev.docker.repositories.corp.ondemand.com/cxm/uideploy-service:latest  312
        name: <module>-ui-deploy # INSERT YOUR MODULE NAME HERE
      imagePullSecrets:  306
      - name: cxm-repo-reader # cxm-dev for Sandbox
      restartPolicy: Never
```

FIG. 3A

```
kind: Job
metadata:
  name: rel-intelligence-ui-deploy       ─ 352
spec:
  backoffLimit: 4
  template:
    metadata:
      name: rel-intelligence-ui-deploy
    spec:
      serviceAccountName: ui-deploy
      containers:
        - env:
            - name: MODULE_KEY            ─ 354
              value: modules/rel-manager/rel-intelligence-ui
            - name: MODULE_HASH           ─ 356
              value: d7c5458475a7eb3134227df14427cc63de09a5c1/main.db6cc2b5685f212ee3b3.js
          image: cxm.docker.repositories.corp.ondemand.com/cxm/ui-deploy-service:latest   ─ 358
          name: rel-intelligence-ui-deploy
      imagePullSecrets:
        - name: cxm-repo-reader
      restartPolicy: Never
```

DEPLOYING MICRO FRONTENDS TO DIFFERENT CLUSTERS FROM A SINGLE REPOSITORY

TECHNICAL FIELD

The present disclosure relates to computer-implemented methods, software, and systems for deploying micro frontends to different clusters from a single repository.

BACKGROUND

Development of software projects, such as development of microservices and corresponding micro frontends, can go through different stages. For example, developers may first test new code changes in a development stage. If testing in a development stage succeeds, further testing may be performed in a staging phase. Further successful tests can result in deployment of changes to pre-production and production environments.

SUMMARY

The present disclosure involves systems, software, and computer implemented methods for deploying micro frontends to different clusters from a single repository. An example method includes receiving, by a user interface (UI) deployment service instance running in a runtime cluster, a module name and module hash of a UI module to deploy, where the module hash corresponds to a UI bundle file name of a UI bundle file that includes build output from building the UI module. The method then includes using the module name and module hash to update a shell service database used by a shell service serving applications for the runtime cluster, where updating the shell service database includes updating a module hash stored in the shell database for the UI module. A manifest for the runtime cluster is generated using the updated shell service database, and a determination is made by the UI deployment service instance that the UI deployment service instance is running in the runtime cluster, and the manifest for the runtime cluster is stored in a manifest repository in a cluster-specific folder corresponding to the runtime cluster. A manifest location value in the shell service database is updated to refer to the cluster-specific folder to enable the shell service, in response to an application request to load the UI module, to access the manifest for the runtime cluster to determine the UI bundle file name for loading the UI bundle file when loading the UI module.

These and other implementations can optionally include the following features. Different instances of the same UI deployment service can run in different runtime clusters. The different runtime clusters can include development, staging, pre-production, and production clusters. Different UI deployment service instances of a same UI deployment service can be used for different UI modules. The UI deployment service instance can receive the module name and the module hash from a deployment pipeline. The deployment pipeline can be invoked after a build process. The build process can generate the module hash using contents of the UI module. Code for the UI module can be stored with code for other UI modules in a single code repository. The manifest repository can store manifests for other versions of the UI module in other folders of the manifest repository corresponding to other runtime clusters. The manifest repository can store manifests for other UI modules other than the UI module.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3A illustrates an example template manifest.

FIG. 3B illustrates an example manifest instance.

DETAILED DESCRIPTION

Figure 1:
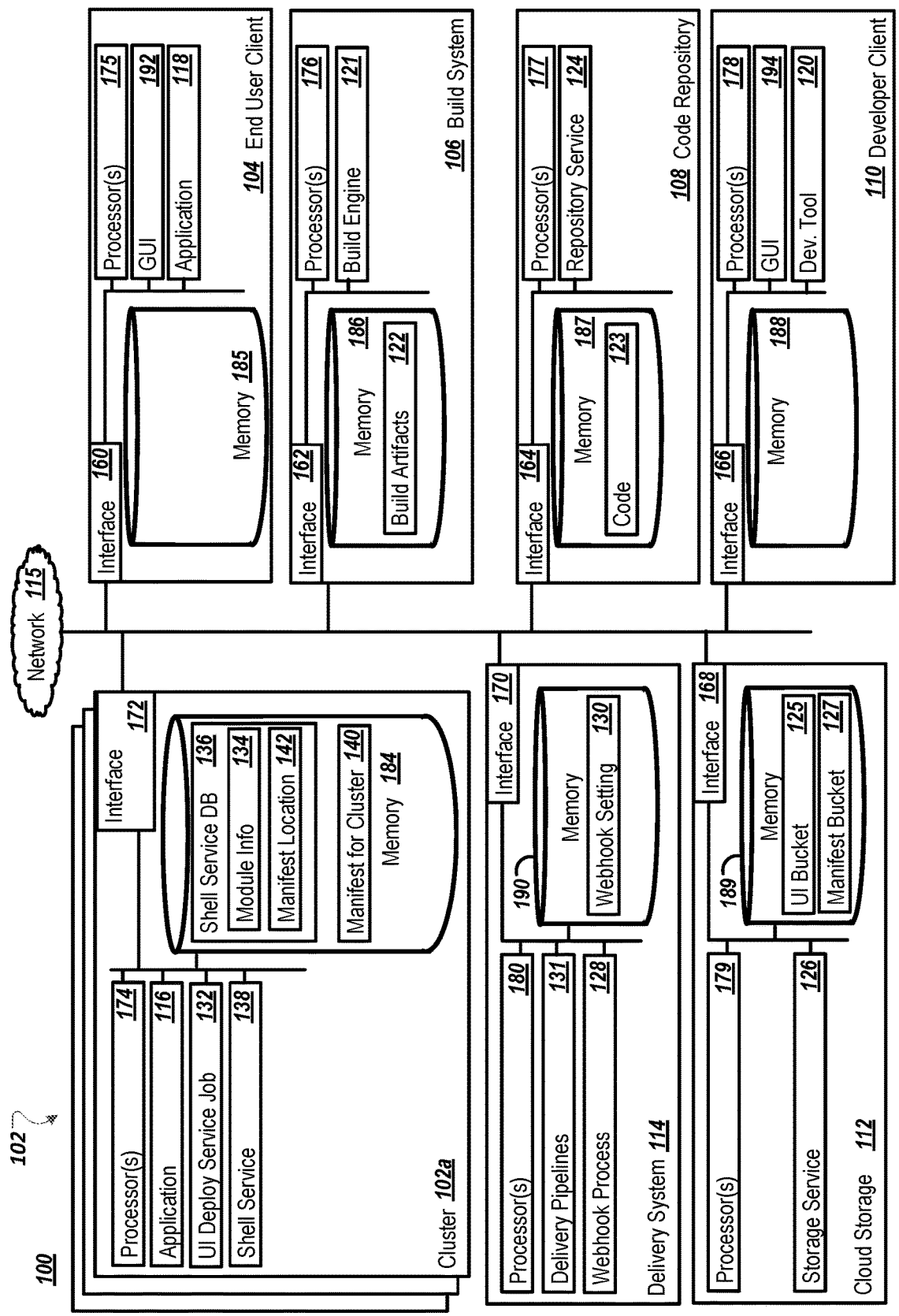
FIG. 1 is a block diagram illustrating an example system for deploying micro frontends to different clusters from a single repository.

A deployment can occur in different phases. For example, a deployment can occur first in a development phase, then a staging phase, then pre-production (e.g., "pre-prod"), and finally production. Different runtime cluster environments (e.g., clusters) can be used for development, staging, pre-prod, and production, for example. A deployment can involve changes to both a microservices backend portion and a UI (User Interface) micro frontend portion. A deployment and delivery pipeline can be configured to ensure that compatible microservice and micro frontend changes are deployed to a same cluster. Compatible changes can be deployed to a cluster in an automated fashion, without user intervention, and without requiring a customer user to have to wait or restart or reset an application.

The deployment and delivery pipeline can use what can be referred to as a monorepository (e.g., "monorepo"), which is a single code repository that includes code for different microservices and micro frontends. The deployment and delivery pipeline can include or use other components, such as a build system (which, in some implementations, can be a Jenkins build system), a delivery system (which, in some implementations, can be a Spinnaker™ delivery system), and cloud storage for storing build artifacts.

A single cloud storage bucket can be used for storing artifacts from the build system. However, a single cloud storage bucket, without further separation for different versions of artifacts, can result, for example, in older microservice backend code referencing newer (and possibly incompatible) micro frontend code. For example, different versions of microservice code running in different clusters could each access a same UI artifact, even though the UI artifact may be compatible with only some, or perhaps one, of the versions of microservice code. A deployment and delivery pipeline can be configured to avoid microservice code using incompatible micro frontend code.

For example, an automated deployment and delivery pipeline can be configured that uses the monorepo, the build system, and the delivery system to deploy multiple, different micro frontends to different clusters from the single monorepo repository. In further detail, a separate job using a same image of a UI deployment service can be executed for each deployment of each UI module. The UI deployment service can be reused, such as for different UI modules and for different deployments to different clusters. The UI deployment service can deploy the UI module to the correct cluster based on a received module name and module hash, as described in more detail below. A different deployment service does not need to be developed for each different UI module.

Use of the automated deployment and delivery pipeline can ensure that an appropriate version of a UI module is deployed to a given cluster based on an explicit request to deploy the UI module to that cluster. Other clusters can continue to use a different version of the UI module, as appropriate, and can be updated at a later time, if necessary and/or desired. The automated deployment and delivery pipeline can ensure that the UI deployed to each cluster reflects a state that is appropriate for that cluster, without requiring multiple copies of a repository. Different UI modules can be deployed separately, based on development and testing needs, while still providing a seamless experience for the end user (e.g., the end user can still experience the application as a consistent, collaborative interface, even as different versions of UI modules are deployed to different clusters).

FIG. 1 is a block diagram illustrating an example system 100 for deploying micro frontends to different clusters from a single repository. Specifically, the illustrated system 100 includes or is communicably coupled with different clusters 102, an end user client device 104, a build system 106, a code repository 108, a developer client device 110, cloud storage 112, a delivery system 114, and a network 115. Although shown separately, in some implementations, functionality of two or more systems or servers may be provided by a single system or server. For example, some or all functions of the build system 106 and the delivery system 114 may reside on a single system. In some implementations, the functionality of one illustrated system, server, or component may be provided by multiple systems, servers, or components, respectively.

The clusters 102 can include different clusters for different phases of development of an application 116. For example, a cluster 102a may be a production cluster and the application 116 may be a production application that is available in a production environment. Other clusters 102 can correspond, for example, to pre-production, staging or development environments, for example. The application 116 may use different microservices and may be based on various, different micro frontends, for example. An end user can use a client application 118 running on the end user client device 104 to access the application 116, for instance.

A developer may use a development tool 120 on the developer client device 110 to develop changes, for example, to a microservice and/or a UI module corresponding to a micro frontend for the microservice. The developer can use a build engine 121 on the build system 106 to build the application, with the build resulting in build artifacts 122 for the UI module. The build engine 121 can use code 123 for the UI module that the developer has checked into the code repository 108 using a repository service 124. The build artifacts 122 can be copied to the cloud storage 112, e.g., to a UI bucket 125 (e.g., using a storage service 126). A deployment manifest can also be copied to a manifest bucket 127.

The build system 106 can be configured to interface with the delivery system 114. For example, the build system 106 can invoke a webhook process 128 using a webhook setting 130 (e.g., associated with one or more delivery pipelines 131). The build system 106 can provide a module name and a hash of the module contents to the webhook process 128. The webhook process 128 can be configured to invoke a UI deploy service job 132 in a cluster 102 to which a current deployment is targeted. The webhook process 128 can provide the module name and module hash to the UI deploy service job 132. The UI deploy service job 132 can update module information 134 for the module in a shell service database 136 to include the module name and module hash. The shell service database 136 can be a database used by a shell service 138. The shell service 138 can be a service running in a given cluster 102 (e.g., the cluster 102a) that handles requests for the application 116, for example.

The UI deploy service job 132 can generate a manifest 140 for the cluster 102a, using the module information 134 in the updated shell service database 136. The UI deployment service job 132 can determine in which cluster (e.g., the cluster 102a, for instance a production cluster) that the UI deployment service job 132 is running. The UI deployment service job 132 can upload the manifest 140 to the cloud storage 112 (e.g. in the manifest bucket 127), in a cluster-specific folder corresponding to the cluster 102a. The cloud storage 112 can have different folders for different clusters, for example. The UI deployment service job 132 can update a manifest location value 142 in the shell service database 136 to refer to the cluster-specific folder to which the manifest 140 was copied. The shell service 138 can use the manifest location value 142 to access the copy of the manifest 140 from the cloud storage 112, to determine which file to load when loading the recently deployed UI module, for example.

As used in the present disclosure, the term "computer" is intended to encompass any suitable processing device. Each computing device may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, each computing device may be adapted to execute any operating system, including LINUX, UNIX, WINDOWS®, Mac OS®, Java™, Android™, iOS™ or any other suitable operating system.

Interfaces 160, 162, 164, 166, 168, 170, and 172 are used by the end user client device 104, the build system 106, the code repository 108, the developer client device 110, the cloud storage 112, the delivery system 114, and a given cluster 102, respectively, for communicating with other systems in a distributed environment—including within the system 100—connected to the network 115. Generally, the interfaces 160, 162, 164, 166, 168, 170, and 172 each comprise logic encoded in software and/or hardware in a suitable combination and operable to communicate with the network 115. More specifically, the interfaces 160, 162, 164, 166, 168, 170, and 172 may each comprise software supporting one or more communication protocols associated with communications such that the network 115 or interface's hardware is operable to communicate physical signals within and outside of the illustrated system 100. Although a single network 115 is shown, multiple, different networks can be used.

The cluster 102a, the end user client device 104, the build system 106, the code repository 108, the developer client device 110, the cloud storage 112, and the delivery system 114 each respectively include processors(s) 174, 175, 176, 177, 178, 179, or 180. Each processor in the processor(s)

174, 175, 176, 177, 178, 179, or 180 may be a central processing unit (CPU), a blade, an application specific integrated circuit (ASIC), a field-programmable gate array (FPGA), or another suitable component. Generally, each processor in the processor(s) 174, 175, 176, 177, 178, 179, or 180 executes instructions and manipulates data to perform the operations of the respective computing device.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The cluster 102a, the end user client device 104, the build system 106, the code repository 108, the developer client device 110, the cloud storage 112, and the delivery system 114 each respectively include memory 184, 185, 186, 187, 188, 189, or 190. In some implementations, a given device may include multiple memories. Each of the memory 184, 185, 186, 187, 188, 189, and 190 may include any type of memory or database module and may take the form of volatile and/or non-volatile memory including, without limitation, magnetic media, optical media, random access memory (RAM), read-only memory (ROM), removable media, or any other suitable local or remote memory component. Each of the memory 184, 185, 186, 187, 188, 189, and 190 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the respective computing device.

The end user client device 104 and the developer client device 110 may each generally be any computing device operable to connect to or communicate with other computing devices via the network 114 using a wireline or wireless connection. In general, the end user client device 104 and the developer client device 110 each comprise an electronic computer device operable to receive, transmit, process, and store any appropriate data associated with the system 100 of FIG. 1. The end user client device 104 and the developer client device 110 can each include one or more client applications, including the client application 118 or the development tool 120, for example. A client application is any type of application that allows the client device 104 to request and view content on the respective client device. In some implementations, a client application can use parameters, metadata, and other information received at launch to access a particular set of data from a given server. For example, in some instances, a client application may be an agent or client-side version of the one or more server applications running on a server.

The end user client device 104 and the developer client device 110 are each generally intended to encompass any client computing device such as a laptop/notebook computer, wireless data port, smart phone, personal data assistant (PDA), tablet computing device, one or more processors within these devices, or any other suitable processing device. For example, the end user client device 104 and the developer client device 110 may each comprise a computer that includes an input device, such as a keypad, touch screen, or other device that can accept user information, and an output device that conveys information, including digital data, visual information, or a GUI 192 or 194, respectively.

The GUIs 192 and 194 can each interface with at least a portion of the system 100 for any suitable purpose, including generating a visual representation of the client application 118 or the development tool 120, respectively. In particular, the GUI 192 and the GUI 192 may each be used to view and navigate various Web pages, or other user interfaces. Generally, the GUI 192 and the GUI 194 each provide the user with an efficient and user-friendly presentation of data provided by or communicated within the system. The GUI 192 and the GUI 194 may each comprise a plurality of customizable frames or views having interactive fields, pull-down lists, and buttons operated by the user. The GUI 192 and the GUI 194 each contemplate any suitable graphical user interface, such as a combination of a generic web browser, intelligent engine, and command line interface (CLI) that processes information and efficiently presents the results to the user visually.

There may be any number of end user client devices 104 and developer client devices 110 associated with, or external to, the system 100. For example, while the illustrated system 100 includes one end user client device 104 and one developer client device 110, alternative implementations of the system 100 may include multiple end user client devices 104 and developer client devices 110 communicably coupled to the network 115, or any other number suitable to the purposes of the system 100. Additionally, there may also be one or more additional client devices external to the illustrated portion of system 100 that are capable of interacting with the system 100 via the network 115. Further, the term "client", "client device" and "user" may be used interchangeably as appropriate without departing from the scope of this disclosure. Moreover, while a client device may be described in terms of being used by a single user, this disclosure contemplates that many users may use one computer, or that one user may use multiple computers.

Figure 2:
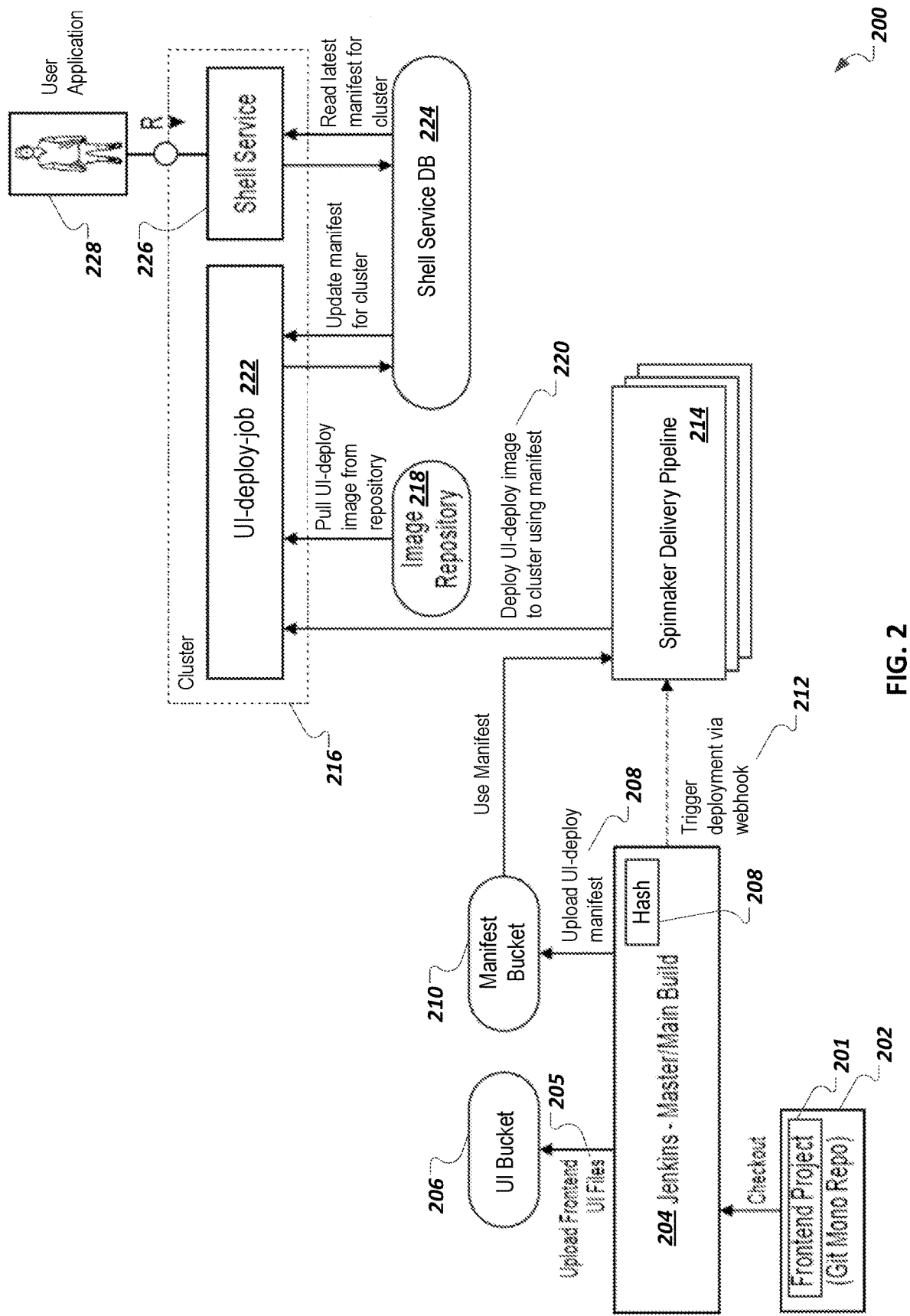
FIG. 2 illustrates an example system for deploying a UI module.

FIG. 2 illustrates an example system 200 for deploying a UI module. A developer can check in code for a micro frontend project 201 to a monorepo 202. The monorepo 202 can include code for other micro frontend projects and microservice backend projects. The micro frontend project 201 can correspond to a particular micro frontend module (e.g., UI module), for example. The UI module can be linked to a given microservice (e.g., a microservice definition can refer to the UI module).

Checking in code for the micro frontend project 201 to the monorepo 202 can trigger a build to occur in a build system 204. The build system 204 can be a Jenkins system or some other type of build system. Before (or during) the build, changes to the micro frontend project 201 can be merged to a master branch in the monorepo 202. The build system 204 can perform a master build using the master branch. An output of the build can be a package of UI artifacts 205 that are to be deployed. The UI artifacts 205 can include a bundle file and other types of assets.

The build system 204 can also generate a hash 208 for the micro frontend project 201. The hash 208 can be generated from content of the code for the micro frontend project 201 that was checked into the monorepo 202 for the micro frontend project 201, for example. The build system 204 can name the bundle file using the hash 208 as at least part of the bundle file name.

The build system 204 can store the UI artifacts 205 in a UI bucket 206 of a cloud storage system. The UI bucket 206 of the cloud storage system can have a separate module folder for each micro frontend module. The build system 204 can upload the UI artifacts 205 for a given deployment to a separate folder within the module folder for the deployed module. The separate folder for the deployment can have a unique hash key (e.g., based on the hash 208).

The build system 204 can also generate (or in some cases, modify) a UI deploy manifest 208. The build system 204 can add the hash 208 as an environment variable to the UI deploy manifest 208. Additionally, the UI deploy manifest 208 can include a module key variable that has a value of a module path. In some implementations, the build system 204 locates a template manifest file in the micro frontend project 201 and updates MODULE_KEY and MODULE_HASH values with the module path and the hash 208, for example. In some implementations, the build system 204 locates a manifest file that has been named according to a naming convention, such as "*-ui-deploy*.yaml", and modifies the located manifest file (e.g., to update MODULE_KEY and/or MODULE_HASH values).

FIG. 3A illustrates an example template manifest 300. The template manifest 300 includes module name items 302, 304, and 306 that can be modified to include a module name of a respective module. The template manifest 300 includes a MODULE_KEY placeholder 308 and a MODULE_HASH placeholder 310 that can be replaced with an actual module path and a module hash by the build system 204 of FIG. 2, for example. The template manifest 300 can be used for different UI modules, with the module path and module hash being adjusted for each deployment of each module. The template manifest 300 refers to an image 312 of a same deploy service that can be used to deploy different UI modules.

FIG. 3B illustrates an example manifest instance 350. The manifest instance 350, which can be generated based on the template manifest 300, is for a rel-intelligence-ui-deploy deployment 352. A module path 354 and a module hash 356 have been added to the manifest instance 350, e.g., by the build system 204 of FIG. 2. The manifest instance 350 refers to an image 358 of a UI deploy service that can be used to deploy the module located at the module path 354 and other modules (e.g., other modules in response to different invocations of the deploy service).

Referring again to FIG. 2, the build system 204 can upload the UI deploy manifest 208 to a manifest bucket 210 in the cloud storage. The build system 204 can, for example during a deployment stage of the build, invoke a webhook 212 that has been configured for a delivery system pipeline 214. The webhook 212 can be associated with an endpoint that triggers the delivery system pipeline 214 in response to receiving a request from the build system 204. The delivery system pipeline 214 can be a Spinnaker™ pipeline and the webhook 212 can be a Spinnaker™ webhook, for example. The delivery system pipeline 214 can be executed by a delivery system (e.g., a Spinnaker™ delivery system) for a deployment of the UI module. The pipeline can include various tasks (including execution of the webhook 212) for managing the deployment of the module. A delivery system pipeline 214 can exist for each UI module for each cluster.

The webhook 212 can retrieve and use the UI deploy manifest 208 to trigger a deployment to a particular cluster 216. The cluster 216 can be a development cluster, a staging cluster, a pre-prod cluster, or a production cluster, for example. After the UI module has been deployed to a development cluster, testing can occur to validate changes made to the UI module, for example. After successful testing has been performed in the development cluster, the UI module can be deployed to a pre-prod cluster (e.g., using a webhook configured for a delivery system pipeline 214 for the pre-prod cluster), where further testing can be performed. After successful testing has been performed in the pre-prod cluster, the UI module can be deployed to a production cluster (e.g., using a webhook configured for a delivery system pipeline 214 for the production cluster).

At a given point in time, each of the development, staging, pre-prod, and production clusters could have a different version of the UI module. For example, the production cluster can have a first version of the UI module that has gone through successful testing in the development, staging, and pre-prod clusters. The pre-prod cluster can have a second version of the UI module that has gone through successful testing in the staging cluster and the development cluster but which is currently undergoing testing in the pre-prod cluster. The staging cluster can have a third version of the UI module that has not had tested completed in the staging cluster. The development cluster can have a fourth version of the UI module that includes a change recently made by a developer.

In some implementations, a delivery pipeline for some phases can be automatically triggered. For instance, for development and staging pipelines, a respective pipeline can be automatically triggered in response to placement of a new version of an image of the UI module (e.g., to an image repository 218). Other pipelines, such as a pre-production or production pipeline, can be manually triggered after appropriate scans and security checks have been successfully performed.

The UI deploy manifest 208 can include a reference to an image of a UI deploy service (e.g., a UI-deploy-image 220) stored in the image repository 218. The webhook 212 can initiate an execution of a UI deploy service job 222 in the cluster 216, using the UI-deploy image 220. The webhook 212 can retrieve the module name and the module hash from the UI manifest 208 and provide the module name and module hash to as parameters to the UI deploy service job 222. The UI deploy service can be a same service that is invoked, as different jobs, for different deployments of different UI modules. A particular invocation of the UI deploy service (e.g., the UI deploy service job 222) can correspond to deployment of change(s) to a particular UI module.

The UI deploy service job 222 can update a shell service database 224 with the module name and hash received by the UI deploy service 222 job when the UI deploy service job 222 was invoked. As mentioned, the hash corresponds to a bundle file name for the UI module. The shell service database 224 can include information used by a shell service 226. The shell service 226 can be a service that services requests for the cluster 216, such as from an application 228. After being updated by the UI deploy service job 222, the shell service database 224 includes information indicating, for the cluster 216 and for the module having the received module name, a bundle file for the UI module that the shell service 226 should access when loading the UI module. The module name and module hash (e.g., bundle file name) can be stored for the module in a module information table in the shell service database 224, along with similar information for other UI modules.

After the shell service database 224 has been updated, the UI deploy service job 222 can build an updated manifest for the cluster. The UI deploy service job 222 can read all of the entries in the module information table in the shell service database 224 and create a manifest for the cluster 216. The manifest for the cluster 216 can include, for each module, the module name, and bundle file name and location information (e.g., with the location information corresponding to a path prefix (e.g., relative path) within the cloud storage). As described below, the UI deploy service job 222 can upload the manifest for the cluster 216 to a cluster-specific folder in the cloud storage.

The UI deploy service 222 can be configured to determine in which cluster 216 the UI deploy service is running. For example, the UI deploy service 222 can execute a system call within the cluster to determine a current cluster. The current cluster (e.g., the cluster 216) may be, for example, a development cluster, a pre-prod cluster, or a production cluster. The UI deploy service 222 can copy the manifest for the cluster to a specific folder in the cloud storage (e.g., in the manifest bucket 210). For example, if the UI deploy service job 222 is executed in the development cluster then the manifest for the cluster 216 can be copied to a development cluster folder in the cloud storage. As another example, when the same UI deploy service job 222 runs in a staging cluster the manifest for the cluster 216 can be copied to a staging cluster folder in the cloud storage.

The UI deploy service job 222 can update the shell service database 224 to include information about the location in the cloud storage of the uploaded manifest for the cluster 216. In some implementations, the UI deploy service job 222 updates a location value for a "manifest.json" key in the shell service database 224 to reflect the location in the cloud storage of the uploaded manifest for the cluster 216. The shell service 226 can, for example, when displaying a user interface (e.g., micro frontend) associated with a microservice, access the manifest for the cluster 216 to determine which bundle file to use when loading a particular UI module, for example. The shell service 226 can query the shell service database 224 for the manifest.json key, for example, to retrieve the location of the manifest for the cluster 216.

Figure 4:
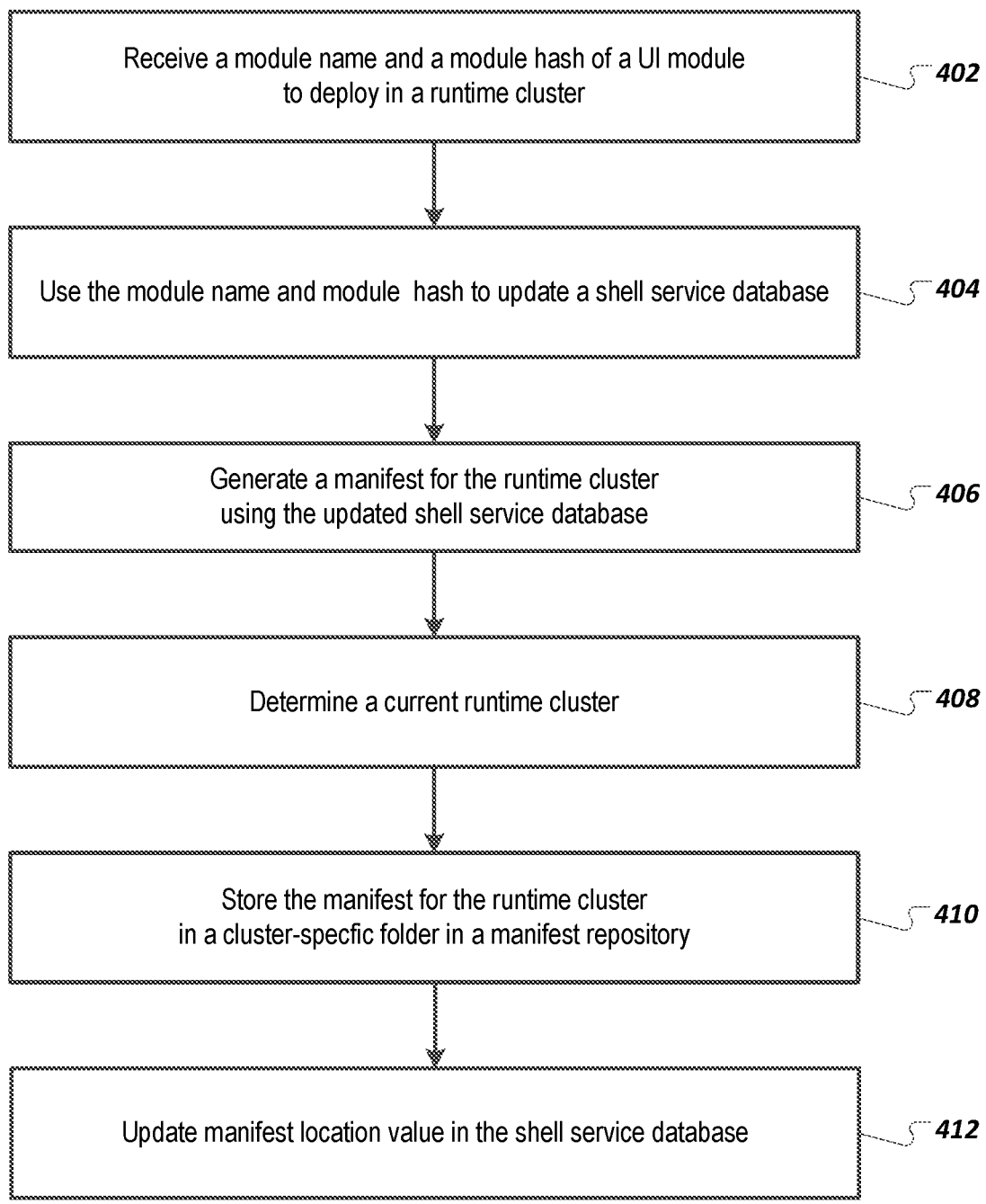
FIG. 4 is a flowchart of an example method for deploying micro frontends to different clusters from a single repository.

FIG. 4 is a flowchart of an example method for deploying micro frontends to different clusters from a single repository. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 1 described above with respect to FIG. 1. For example, the method 400 and related methods can be executed by the UI deploy service job 132 of FIG. 1.

At 402, a module name and module hash of a UI module to deploy is received by a UI deployment service instance running in a runtime cluster. The module hash corresponds to a UI bundle file name of a UI bundle file that includes build output from building the UI module. Different instances of the same UI deployment service can run in different runtime clusters. The different runtime clusters can include development, staging, pre-production, and production clusters. Different UI deployment service instances of a same UI deployment service can be used for different UI modules.

The UI deployment service instance can receive the module name and the module hash from a deployment pipeline. The deployment pipeline can be invoked after a build process. The build process can generate the module hash using contents of the UI module. Code for the UI module can be stored with code for other UI modules in a single code repository.

At 404, the module name and module hash are used to update a shell service database used by a shell service serving applications for the runtime cluster. Updating the shell service database includes updating a module hash stored in the shell database for the UI module.

At 406, a manifest for the runtime cluster is generated using the updated shell service database.

At 408, a current cluster is determined. That is, a determination is made, by the UI deployment service instance, that the UI deployment service instance is running in the runtime cluster.

At 410, the manifest for the runtime cluster is stored in a manifest repository in a cluster-specific folder corresponding to the runtime cluster. The manifest repository can store manifests for other versions of the UI module in other folders of the manifest repository corresponding to other runtime clusters. The manifest repository can store manifests for other UI modules other than the UI module.

At 412, a manifest location value in the shell service database is updated to refer to the cluster-specific folder, to enable the shell service, in response to an application request to load the UI module, to access the manifest for the runtime cluster to determine the UI bundle file name for loading the UI bundle file when loading the UI module.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

What is claimed is:

1. A computer-implemented method comprising:
receiving, by a user interface (UI) deployment service instance running in a runtime cluster, a module name and module hash of a UI module to deploy, wherein the module hash corresponds to a UI bundle file name of a UI bundle file that includes build output from building the UI module;
using the module name and module hash to update a shell service database used by a shell service serving applications for the runtime cluster, wherein updating the shell service database includes updating a module hash stored in the shell database for the UI module;
generating a manifest for the runtime cluster, using the updated shell service database;
determining, by the UI deployment service instance, that the UI deployment service instance is running in the runtime cluster;
storing, in a manifest repository, in a cluster-specific folder corresponding to the runtime cluster, the manifest for the runtime cluster, wherein the manifest repository stores manifests for other versions of the UI module in other folders of the manifest repository corresponding to at least one other runtime cluster; and
updating a manifest location value in the shell service database to refer to the cluster- specific folder, to enable the shell service, in response to an application request to load the UI module, to access the manifest for the runtime cluster to determine the UI bundle file name for loading the UI bundle file when loading the UI module.

2. The computer-implemented method of claim 1, wherein different instances of the same UI deployment service run in different runtime clusters.

3. The computer-implemented method of claim 1, wherein the different runtime clusters include development, staging, pre-production, and production clusters.

4. The computer-implemented method of claim 3, wherein the other versions of the UI module include at least one of a first version of the UI module for the production cluster, a second version of the UI module for the pre-production cluster, a third version of the UI module for the staging cluster, and a fourth version of the UI module for the development cluster, where each of the first, second, third, and fourth versions are different versions of the UI module.

5. The computer-implemented method of claim 1, wherein different UI deployment service instances of a same UI deployment service are used for different UI modules.

6. The computer-implemented method of claim 1, wherein the UI deployment service instance receives the module name and the module hash from a deployment pipeline.

7. The computer-implemented method of claim 1, wherein the deployment pipeline is invoked after a build process.

8. The computer-implemented method of claim 1, wherein the build process generates the module hash using contents of the UI module.

9. The computer-implemented method of claim 1, wherein code for the UI module is stored with code for other UI modules in a single code repository.

10. The computer-implemented method of claim 1, wherein the manifest repository stores manifests for other UI modules other than the UI module.

11. A non-transitory, computer-readable medium coupled to one or more processors and having instructions stored thereon which, when executed by the one or more processors, cause the one or more processors to perform operations, the operations comprising:
receiving, by a user interface (UI) deployment service instance running in a runtime cluster, a module name and module hash of a UI module to deploy, wherein the module hash corresponds to a UI bundle file name of a UI bundle file that includes build output from building the UI module;
using the module name and module hash to update a shell service database used by a shell service serving applications for the runtime cluster, wherein updating the shell service database includes updating a module hash stored in the shell database for the UI module;
generating a manifest for the runtime cluster, using the updated shell service database;
determining, by the UI deployment service instance, that the UI deployment service instance is running in the runtime cluster;
storing, in a manifest repository, in a cluster-specific folder corresponding to the runtime cluster, the manifest for the runtime cluster, wherein the manifest repository stores manifests for other versions of the UI module in other folders of the manifest repository corresponding to at least one other runtime cluster;
updating a manifest location value in the shell service database to refer to the cluster- specific folder, to enable the shell service, in response to an application request to load the UI module, to access the manifest for the runtime cluster to determine the UI bundle file name for loading the UI bundle file when loading the UI module.

12. The computer-readable medium of claim 11, wherein different instances of the same UI deployment service run in different runtime clusters.

13. The computer-readable medium of claim 11, wherein the different runtime clusters include development, staging, pre-production, and production clusters.

14. The computer-readable medium of claim 11, wherein different UI deployment service instances of a same UI deployment service are used for different UI modules.

15. The computer-readable medium of claim 11, wherein the UI deployment service instance receives the module name and the module hash from a deployment pipeline.

16. A system comprising:
a computing device; and
a computer-readable storage device coupled to the computing device and having instructions stored thereon which, when executed by the computing device, cause the computing device to perform operations, the operations comprising:
receiving, by a user interface (UI) deployment service instance running in a runtime cluster, a module name and module hash of a UI module to deploy, wherein the module hash corresponds to a UI bundle file name of a UI bundle file that includes build output from building the UI module;
using the module name and module hash to update a shell service database used by a shell service serving applications for the runtime cluster, wherein updating the shell service database includes updating a module hash stored in the shell database for the UI module;
generating a manifest for the runtime cluster, using the updated shell service database;
determining, by the UI deployment service instance, that the UI deployment service instance is running in the runtime cluster;

storing, in a manifest repository, in a cluster-specific folder corresponding to the runtime cluster, the manifest for the runtime cluster, wherein the manifest repository stores manifests for other versions of the UI module in other folders of the manifest repository corresponding to at least one other runtime cluster;

updating a manifest location value in the shell service database to refer to the cluster-specific folder, to enable the shell service, in response to an application request to load the UI module, to access the manifest for the runtime cluster to determine the UI bundle file name for loading the UI bundle file when loading the UI module.

17. The system of claim 16, wherein different instances of the same UI deployment service run in different runtime clusters.

18. The system of claim 16, wherein the different runtime clusters include development, staging, pre-production, and production clusters.

19. The system of claim 16, wherein different UI deployment service instances of a same UI deployment service are used for different UI modules.

20. The system of claim 16, wherein the UI deployment service instance receives the module name and the module hash from a deployment pipeline.

* * * * *